H. E. SLOAN.
CHUCK.
APPLICATION FILED FEB. 19, 1915.

1,159,875.

Patented Nov. 9, 1915.

WITNESSES:
E. J. Eaton.

INVENTOR.
Harry E. Sloan
BY
Arthur B. Jenkins,
ATTORNEY.

UNITED STATES PATENT OFFICE.

HARRY E. SLOAN, OF HARTFORD, CONNECTICUT, ASSIGNOR TO THE CUSHMAN CHUCK COMPANY, OF HARTFORD, CONNECTICUT, A CORPORATION OF CONNECTICUT.

CHUCK.

1,159,875.

Specification of Letters Patent.

Patented Nov. 9, 1915.

Application filed February 19, 1915. Serial No. 9,269.

*To all whom it may concern:*

Be it known that I, HARRY E. SLOAN, a citizen of the United States, residing at Hartford, in the county of Hartford and State of Connecticut, have invented a new and Improved Chuck, of which the following is a specification.

My invention relates more especially to the class of chucks embodying jaws slidable upon the face of the chuck body in a radial direction and having means including a pinion or pinions for moving said jaws, and an object of my invention, among others, is to provide means for positioning and fastening the pinions within the chuck body, said means enabling the pinions to be easily and conveniently secured in place and as easily and conveniently removed.

One form of chuck embodying my invention and in the construction and use of which the objects herein set out, as well as others, may be attained, is illustrated in the accompanying drawings, in which—

Figure 1:
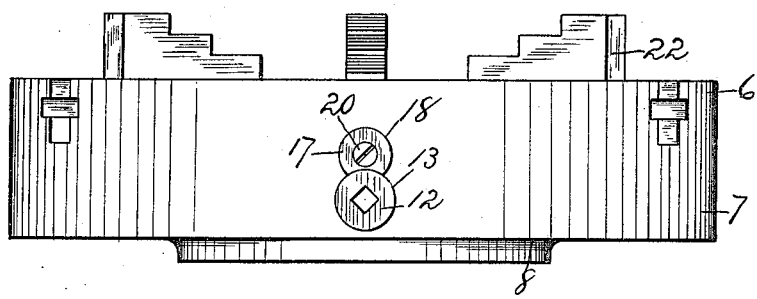
Figure 2:
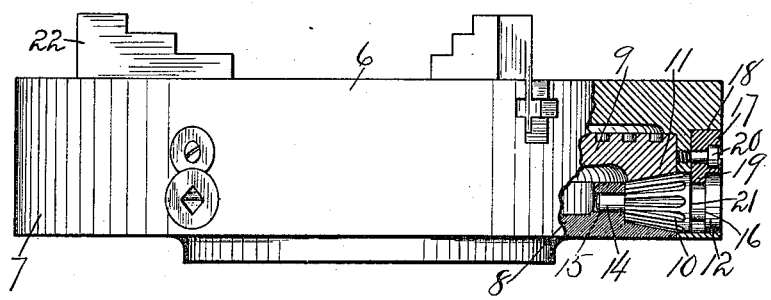

Figure 1 is a side view of a chuck embodying my invention. Fig. 2 is a similar view showing the chuck broken away at one edge to disclose my improved means for securing the pinion in place.

In the accompanying drawings, the numeral 6 denotes the face plate or body part of a chuck having a depending flange 7 at its outer edge, the chamber within the chuck being closed as by a back plate 8, secured in place in any suitable manner. A scroll 9 is rotatably mounted within the chamber in the chuck body, and it engages with the toothed bottom surfaces of chuck jaws 22, the latter being moved radially in the chuck body, by the rotation of the scroll. All of the parts just described are of such old and well known construction that further and detailed description are not required herein, as their construction and operation may be readily understood by those skilled in the art.

In carrying out my invention, I provide a pinion or pinions 10, preferably slightly beveled and having teeth to engage the teeth of a rack 11 on the under side of the scroll 9. This pinion has a head 12 freely fitting a hole 13 made through the flange 7 of the face plate 6, the inner end of the pinion having a projection 14 that is received within a bearing 15 in the back plate 8. This pinion has an annular groove 16 which is especially provided for the purpose of enabling the pinion to be retained in place.

A holder 17 is fitted within a recess 18 opening from the hole 13, the under side of this holder being preferably recessed to fit the outer surface of the head 12. A holding lip 19 projects from the holder into the annular groove 16 in the pinion head, and a screw 20 extending through the holder serves as a means for securing the holder in place.

In assembling the parts the lip 19 is placed within the groove 16, the holder and pinion thus nicely fitting together, and thus assembled they are placed within their respective openings. The screw 20 is then inserted to fasten the holder and secure the pinion in position.

From this construction it will be noted that the holder rests against a shoulder 21 formed upon the pinion and thus prevents outward movement of the pinion, as herein shown this shoulder forming a part of the groove 16, but this shoulder may be formed in other ways, and the holder may be secured in place other than as herein shown, and the details of construction may be varied and yet be within the spirit and intent of the invention, as claimed herein, which is therefore not limited to the exact construction herein illustrated and described.

I claim—

1. A chuck including a body part, chuck jaws movably supported thereby, means including a rack for operating said chuck jaws, a pinion having teeth meshing with the teeth on the rack, said pinion having a head located in a hole opening at the edge of the body part, a shoulder formed on said head, and a holder secured in a recess opening into said hole from one side thereof and in the outer surface of the edge of said body part to engage said shoulder, said holder also resting against the periphery of the head of the pinion.

2. A chuck including a body part having a hole in its edge and a recess opening therefrom at one side thereof and in the outer surface of said body part, chuck jaws movably supported by the body, means including a rack for operating said jaws, a pinion having teeth engaging the teeth of said rack, and a head located in said hole in the chuck body, a shoulder upon the head of said pinion, and a holder secured in said recess to engage said shoulder.

3. A chuck including a body having a circularly shaped hole in its edge and a circularly shaped recess opening thereoutof at one side thereof and in the outer surface of said body part, chuck jaws supported by the body, means including a rack for operating said chuck jaws, a pinion having teeth engaging the teeth of said rack and a head fitting said hole, a shoulder on the pinion, and a holder fitting and secured within said recess and resting against the head of the pinion, and also against said shoulder.

4. A chuck including a body part having a hole in its edge and a recess opening thereoutof on the outer surface of said body and at one side of said hole and in the outer surface of said body part, chuck jaws supported by the body, means including a toothed rack for operating said jaws, a pinion having teeth to engage the teeth of said rack, and a head located in said hole, a shoulder upon the pinion, and a holder secured in said recess to engage said shoulder, the edge of said holder fitting the circular surface of said head.

5. A chuck including a chuck body with a hole in its outer edge and a recess opening out of said hole in the outer surface of said body and at one side of said hole and in the outer surface of said body part, chuck jaws supported by the body, means including a toothed rack for operating said jaws, a headed pinion located in said hole and having teeth engaging the teeth of said rack, the head of said pinion having an annular groove, and a holder secured within said recess and having a lip engaging said groove in the head of said pinion.

6. A chuck including a body part having a hole in its outer edge and a recess opening out of said hole in the outer surface of said body and at one side of said hole and in the outer surface of said body part, chuck jaws supported by the body, means including a toothed rack for feeding said jaws, a headed pinion having teeth engaging the teeth on said rack, said head having an annular groove, and a holder secured within said recess and having a lip engaging said groove, the edge of said holder fitting the circular outer surface of the head of the pinion.

7. A chuck including a body part having a round hole in its edge opening at the surface thereof, a recess in the outer surface of said edge opening from one side of said hole, chuck jaws movably supported by the body, means including a rack for operating said jaws, a pinion having teeth engaging the teeth of said rack and with its inner end mounted in a bearing on the chuck and its outer end having a bearing in said hole, a shoulder upon the head of said pinion, and a holder located in said recess and in contact with the head of the pinion and having a lip engaging the shoulder thereon.

8. A chuck including a body part having a hole extending inwardly from the surface of the edge thereof, a recess in the outer surface of said edge opening into said hole, chuck jaws movably supported by the body, means including a rack for operating said jaws, a pinion having teeth engaging the teeth of said rack and with its outer end located in said hole, an annular groove formed in the head of said pinion, a holder located in said recess and having its edge formed to fit the edge of the head of the pinion, said holder also having a lip extending from its edge into the groove in the head of the pinion, and means extending from the outer face of the surface of said holder into the chuck body to secure the holder in place.

HARRY E. SLOAN.

Witnesses:
ARTHUR B. JENKINS,
E. F. EATON.

Copies of this patent may be obtained for five cents each, by addressing the "Commissioner of Patents, Washington, D. C."